(12) United States Patent
Clegg

(10) Patent No.: US 6,897,870 B1
(45) Date of Patent: May 24, 2005

(54) GLYPH RENDERING QUANTIZATION FOR SUBPIXEL POSITIONING

(75) Inventor: Derek B. Clegg, Redwood City, CA (US)

(73) Assignee: Apple Computer Inc., Cupertino, CA (US)

( * ) Notice: Subject to any disclaimer, the term of this patent is extended or adjusted under 35 U.S.C. 154(b) by 89 days.

(21) Appl. No.: 10/642,353

(22) Filed: Aug. 15, 2003

(51) Int. Cl.$^7$ ................................................ G09G 5/38
(52) U.S. Cl. ....................................... 345/471; 345/467
(58) Field of Search ................................ 382/291, 292; 345/467–472; 358/1.5, 1.11

(56) References Cited

U.S. PATENT DOCUMENTS 4,937,761 A * 6/1990 Hassett ........................ 345/468

* cited by examiner

Primary Examiner—Richard Hjerpe
Assistant Examiner—Michelle K. Lay
(74) Attorney, Agent, or Firm—Fenwick & West LLP

(57) ABSTRACT

A Font Quantization Engine receives layout data including font, font matrix, glyphs and position data. This received position data includes non-integer positions for the glyphs to be rendered. According to a tolerance that is either pre-specified, or selected at run time an appropriate quantization level is determined by the Font Quantization Engine. This quantization level and the fractional position data is then used to determine quantized positions for the glyphs. Once the quantized positions are determined, a rendering engine either renders the bitmaps for the glyphs, or retrieves cached versions of the bitmaps. In this manner, glyphs are positioned at non-integer locations, yet a different bitmap is not required for each possible non-integer location. This allows for both efficiency of operation and the use of higher quality bitmaps.

12 Claims, 6 Drawing Sheets

GLYPH RENDERING QUANTIZATION FOR SUBPIXEL POSITIONING

BACKGROUND OF THE INVENTION

1. Field of the Invention

The present invention relates generally to the positioning and displaying of fonts using a computer system. More particularly, the present invention is directed to quantizing multi-bit glyph bitmaps so that they can be displayed efficiently.

2. Description of the Related Art

Characters that are laid out on a printed page or displayed on a screen are made up of glyphs. Glyphs are typically positioned during layout at non-integral (that is, fractional) locations in what is known to those in the art as "ideal space." For example, the word "that" may be laid out on a line like so:

Place the "t" at position (39.3, 123.7)

Place the "h" at position (42.7, 123.7)

Place the "a" at position (45.2, 123.7)

Place the "t" at position (47.1, 123.7).

Traditionally, glyphs have been represented by 1-bit bitmaps drawn based on integer pixel boundaries. Positioning the bitmaps at locations other than the pixel boundaries is not desirable, because it leads to aliasing. Therefore, when the 1-bit bitmaps such as those in the example above are positioned on the screen, the positions are rounded to integer boundaries. This position of the bitmaps as displayed is referred to by those of skill in the art as their position in the "device space." In the device space where only integer pixel positions are used, the example above becomes:

Place the 1-bit glyph representing "t" at position (39, 124)

Place the 1-bit glyph representing "h" at position (43, 124)

Place the 1-bit glyph representing "a" at position (45, 124)

Place the 1-bit glyph representing "t" at position (47, 124).

These bitmaps are cached, so that they can be reused. For example, the bitmap that was used to place the first "t" at (39, 124) can be reused to place the second "t" at (47, 124).

In the past, additional bits in the glyph bitmap have been used to provide antialiasing for glyphs. Glyphs that are antialiased can be positioned at fractional positions with less loss of quality than non-antialiased glyphs. However, for each fractional position, a different bitmap must be used for a given glyph. That is, a glyph positioned at (392, 104.1) is represented by a different bitmap than is the same glyph positioned at (39.8, 104.7). Caching the bitmaps for each fractional location of each glyph presents a significant drawback because of the associated memory usage required to do the caching. On the other hand, not caching the bitmaps means that the glyphs must be re-rendered whenever needed, sacrificing rendering speed.

Accordingly, there is a need for a system and method for displaying glyph bitmaps at non-integer pixel locations which preserves the speed and efficiency of the corresponding system for displaying 1-bit glyph bitmaps at integer pixel locations."

SUMMARY OF THE INVENTION

The present invention provides a system and method for efficiently rendering high-quality glyphs at non-integer positions. A Font Quantization Engine receives layout data including font, font matrix, glyphs and position data. The position data includes non-integer positions for the glyphs to be rendered. The Font Quantization Engine determines a quantization level according to a tolerance that is either pre-specified or selected at run time. The quantization level and the fractional position data is used to determine quantized positions for the glyphs. A rendering engine either renders the bitmaps for the glyphs, or retrieves cached versions of the bitmaps. In this manner, glyphs are positioned at non-integer locations, yet a different bitmap is not required for each possible non-integer location. This allows for both efficiency of operation and the use of higher quality bitmaps.

The figures depict preferred embodiments of the present invention for purposes of illustration only. One skilled in the art will readily recognize from the following discussion that alternative embodiments of the structures and methods illustrated herein may be employed without departing from the principles of the invention described.

DETAILED DESCRIPTION OF THE PREFERRED EMBODIMENTS

System Architecture

Figure 1:
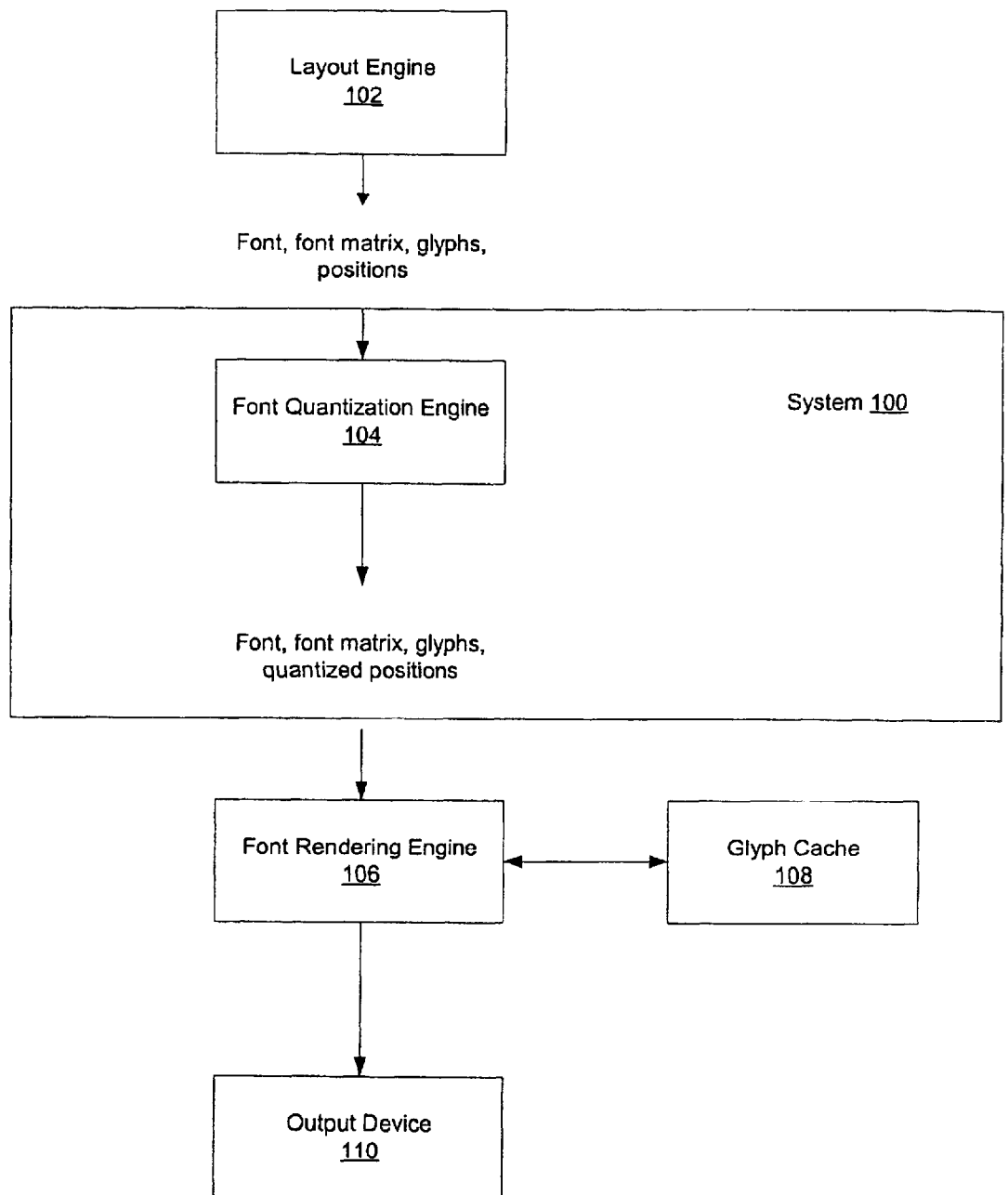
FIG. 1 is a block diagram of a system in accordance with an embodiment of the present invention.

FIG. 1 is a block diagram that illustrates the logical components of a system 100 in accordance with an embodiment of the present invention. System 100 receives fonts to be rendered from Layout Engine 102. Layout Engine 102 additionally supplies a relevant font matrix for the font, the glyphs to be rendered, and the position each glyph should be rendered at in ideal space. As noted earlier, "ideal space" represents the location at which the fonts should be rendered before any adjustments are made for purposes of speed, memory management, etc.

System 100 includes a Font Quantization Engine 104, which determines a quantization level to use for determining a quantized position, and also determines the quantized position, which is then supplied to a Font Rendering Engine 106. The operation of Font Quantization Engine 104 is illustrated further below with reference to FIG. 2. Font Rendering Engine 106 uses data received from Font Quantization Engine 104 to render fonts in appropriate positions. Glyph Cache 108 caches glyph bitmaps so that they do not need to be re-rendered each time they are needed by Font Rendering Engine 106. FIG. 1 also shows an Output Device 110, for displaying or printing the fonts once they have been rendered.

Figure 2:
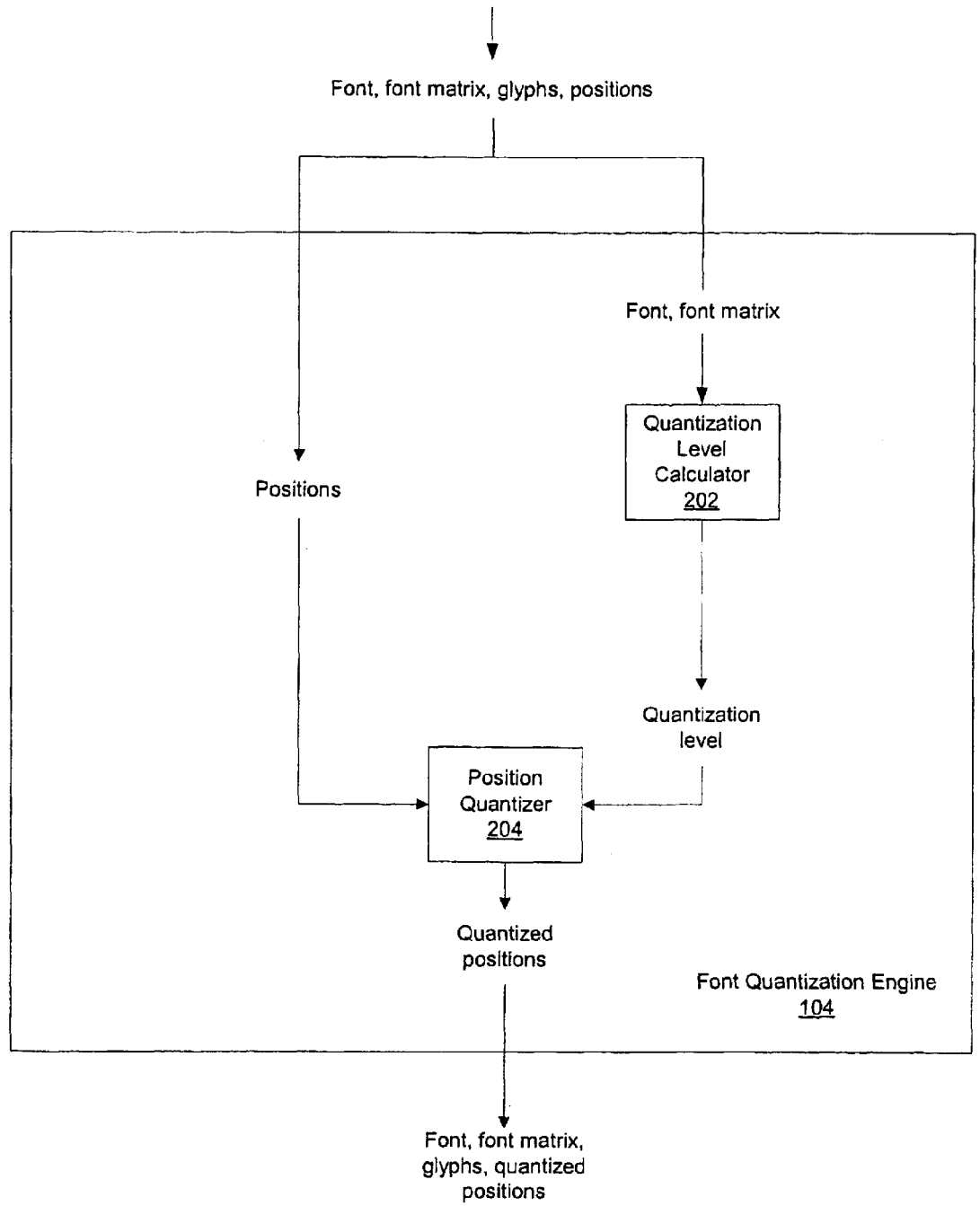
FIG. 2 is a block diagram of a Font Quantization Engine in accordance with an embodiment of the present invention.

Referring now to FIG. 2, there is shown a block diagram of Font Quantization Engine 104. Font Quantization Engine 104 includes a Quantization Level Calculator 202, which determines an appropriate quantization level for a given font and font matrix, based on a predefined tolerance. A Position Quantizer 204 uses positions supplied from Layout Engine 102 and the quantization level supplied by Quantization Level Calculator 202 to determined quantized positions for the glyphs in question. The operation of Quantization Level Calculator 202 and Position Quantizer 204 are described further below, with respect to FIG. 3 and FIG. 5, respectively.

Figure 3:
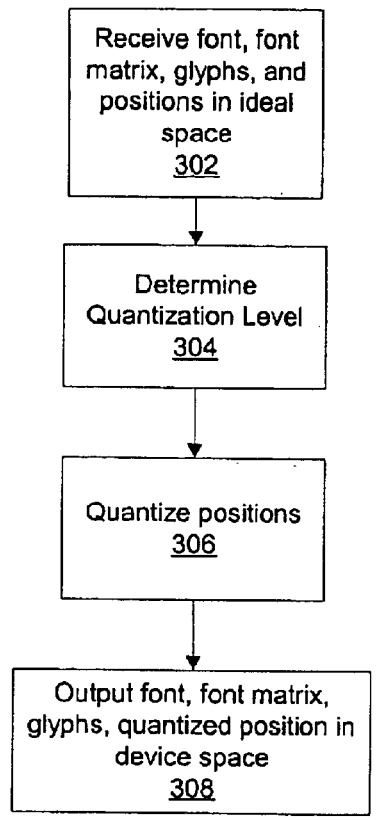
FIG. 3 is a flow chart illustrating a method for determining quantized positions in accordance with an embodiment of the present invention.

FIG. 3 is a flowchart that shows the steps of a method performed in accordance with an embodiment of the present invention. To begin, system 100 receives 302, e.g., from a source such as Layout Engine 102, a font, font matrix, glyphs, and positions in ideal space. Next, system 100 determines 304 a quantization level to use. Using the determined quantization level, system 102 then quantizes 306 the positions of the glyphs received in step 302, thus transforming the position data from the ideal space to the device space. Finally, system 100 outputs 308 the font, font matrix, glyphs, and quantized positions in device space, in a preferred embodiment to a Font Rendering Engine such as Font Rendering Engine 106. Each of these steps is described further below, in greater detail.

Figure 4:
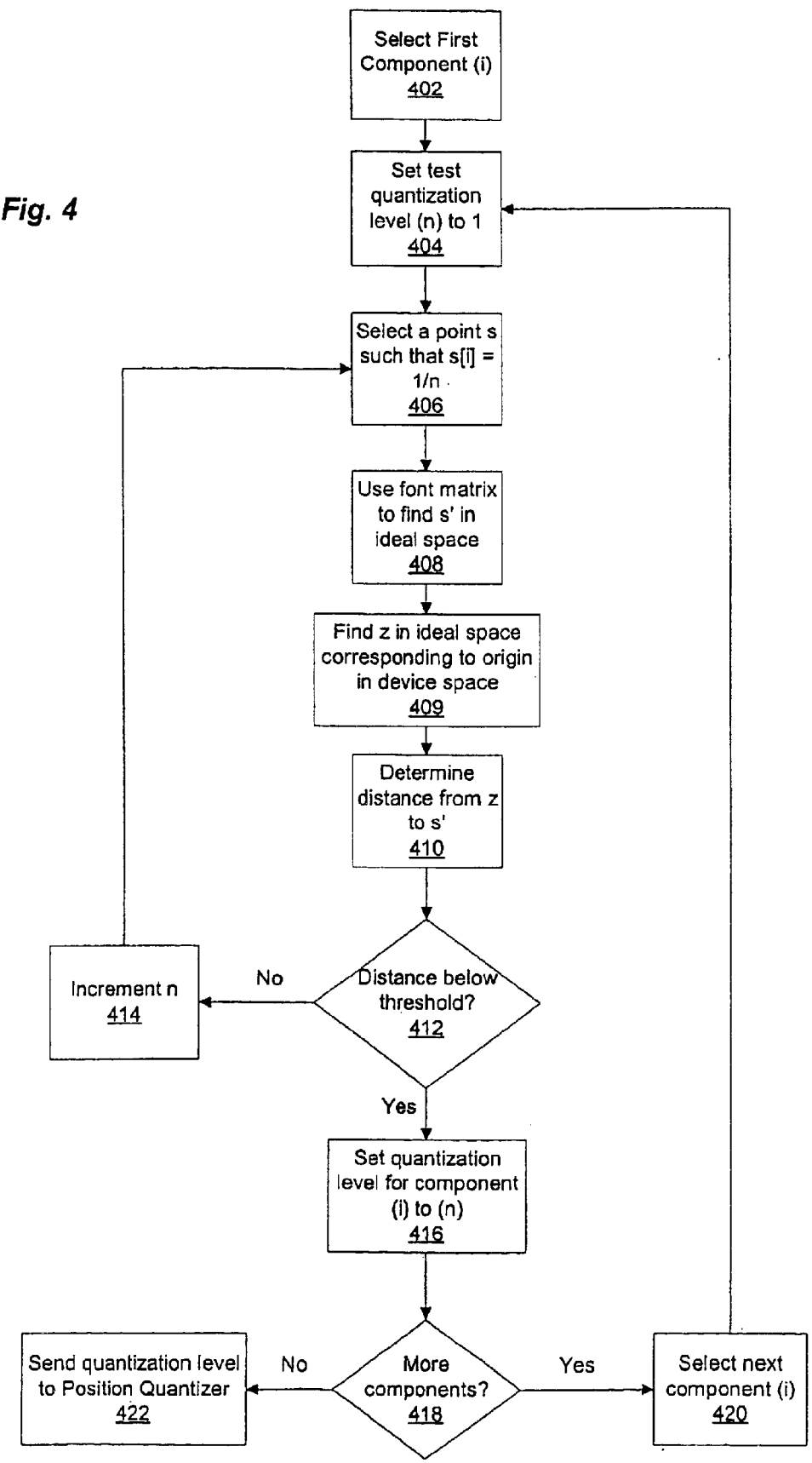
FIG. 4 is a flow chart illustrating a method for determining a Quantization Level in accordance with an embodiment of the present invention.

Referring now to FIG. 4, there is shown a flowchart illustrating a method of determining a Quantization Level, such as is performed by Quantization Level Calculator 202 in a preferred embodiment. Typically, a glyph is made up of two components—an x-coordinate component and a y-coordinate component. While the present invention has application to glyphs with more or fewer components, for clarity of description the case where there are two components is described. To begin, a first component is selected 402, and a test quantization level, n, is set 404 to the value 1. Next, a point s is chosen 406 such that for the current component, i, $s[i]=1/n$, and all other components of s are set to 0. Using the font matrix, a point s' in the ideal space is determined 408, such that s' is the location in ideal space corresponding to the point s in the device space. Using the font matrix, a point z in the ideal space is determined 409 such that z is the location in ideal space corresponding to the origin (that is, the point with all components equal to zero) in the device space. Once z and s' are determined, then the distance between the two points is determined 410. If it is not less than a threshold amount (412), then the quantization level n is incremented 414, and the process returns to step 406. If the distance is less than the threshold amount, then the test quantization level n is set 416 as the quantization level for component i. If more components remain 418 to be determined, the next component is selected 420, and the process returns to step 404. Once all component quantization levels have been set, they are sent 422 to the Position Quantizer 204.

The threshold amount against which the quantization level is compared is preferably determined heuristically, and is chosen so as to minimize the number of bitmaps that will be required for each glyph while still providing a level of positioning accuracy suitable to the designer. In one embodiment, the threshold value is different for each font, while in an alternative embodiment a single threshold is used for all fonts. In addition, in one embodiment the threshold remains fixed at design time, while in an alternative embodiment it can be adjusted, e.g., by an end user, at run time.

Figure 5:
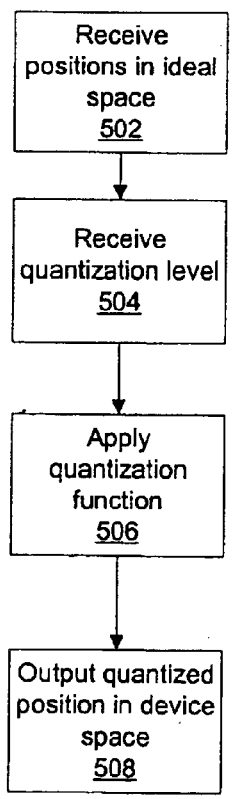
FIG. 5 is a flow chart illustrating a method of operation of a Position Quantizer in accordance with an embodiment of the present invention.

Referring now to FIG. 5 there is shown a flowchart of the operation of Position Quantizer 204 in accordance with an embodiment of the present invention. The Position Quantizer 204 receives 502, 504 positions in ideal space as well as a quantization level. Position Quantizer 204 then applies 506 the quantization function described below to the received position, in order to determine the correct quantized position in device space. Once determined, the quantized position is then output 508, and can be used to render the glyph.

Figure 6:
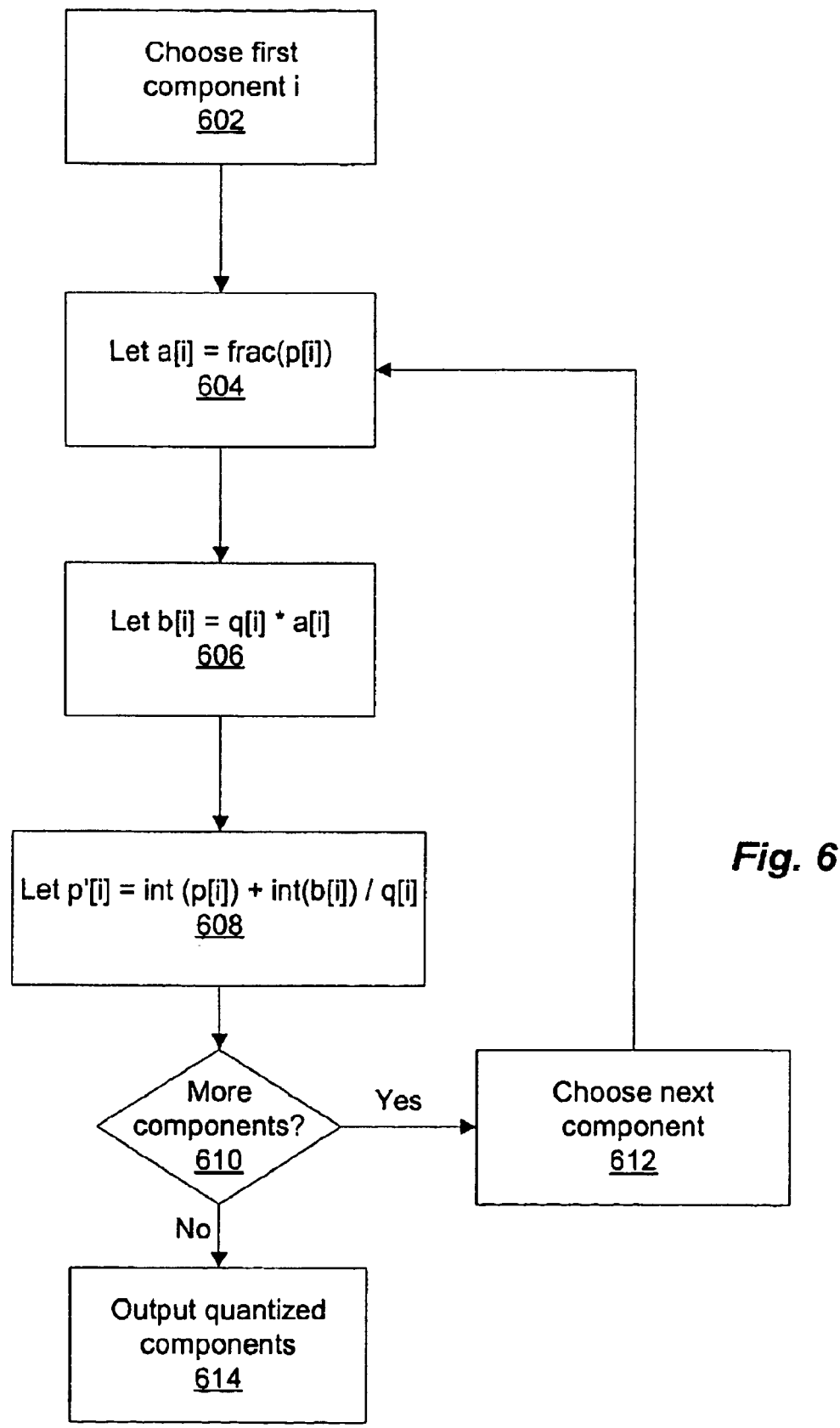
FIG. 6 is a flow chart illustrating a method of quantizing positions in accordance with an embodiment of the present invention.

In a preferred embodiment, the quantization function proceeds as follows: for a glyph positioned at point p, calculate a new point p', and use the resulting p' as the value for looking up a bitmap in a cache, or to generate a bitmap for display or caching. The methodology of this process is described now in greater detail with reference to FIG. 6. By way of example, assume that the point to be quantized is (39.2, 123.8), and that the quantization level is 3.

Since quantization levels are independent for each component in a preferred embodiment, the initial step is to choose 602 the first component for which a position is to be quantized. To continue the example from the preceding paragraph, the first component is the x component, which in one embodiment is represented by a zero. Thus, $p[0]=39.2$.

Next, the variable $a[i]$ is defined 604 to be the fractional component of $p[i]$. That is, $a[i]=frac(p[i])$ $a[0]=frac(39.2)$ $a[0]=0.2$.

In step 606, the variable $b[i]$ is defined to be the product of the quantization level and the fractional component of $p[i]$. That is, $b[i]=q[i]*a[i]$ $b[0]=3*0.2$ $b[0]=0.6$.

Now, let 608 $p'[i]$ be the sum of the integer portion of $p[i]$ and the quotient of the integer portion of $b[i]$ divided by the quantization level:

$p'=int(p[i])+int(b[i])/q[i]$ $p'=int(39.2)+int(0.6)/3$ $p'=39+0/3$ $p'=39$.

With the component's quantized position now determined, if there are more components (610), the next component is selected 612, and the process returns to step 604. When all components have been determined, they are output 614 to the Pont Rendering Engine 106. To conclude the example given, the y component is mapped from 123.8 to ⅔. Thus, for the point (39.2, 123.8), the non-integer offset from an integer pixel is (0, 0.67); the quantized position is (39.0, 123.67).

Figure 7:
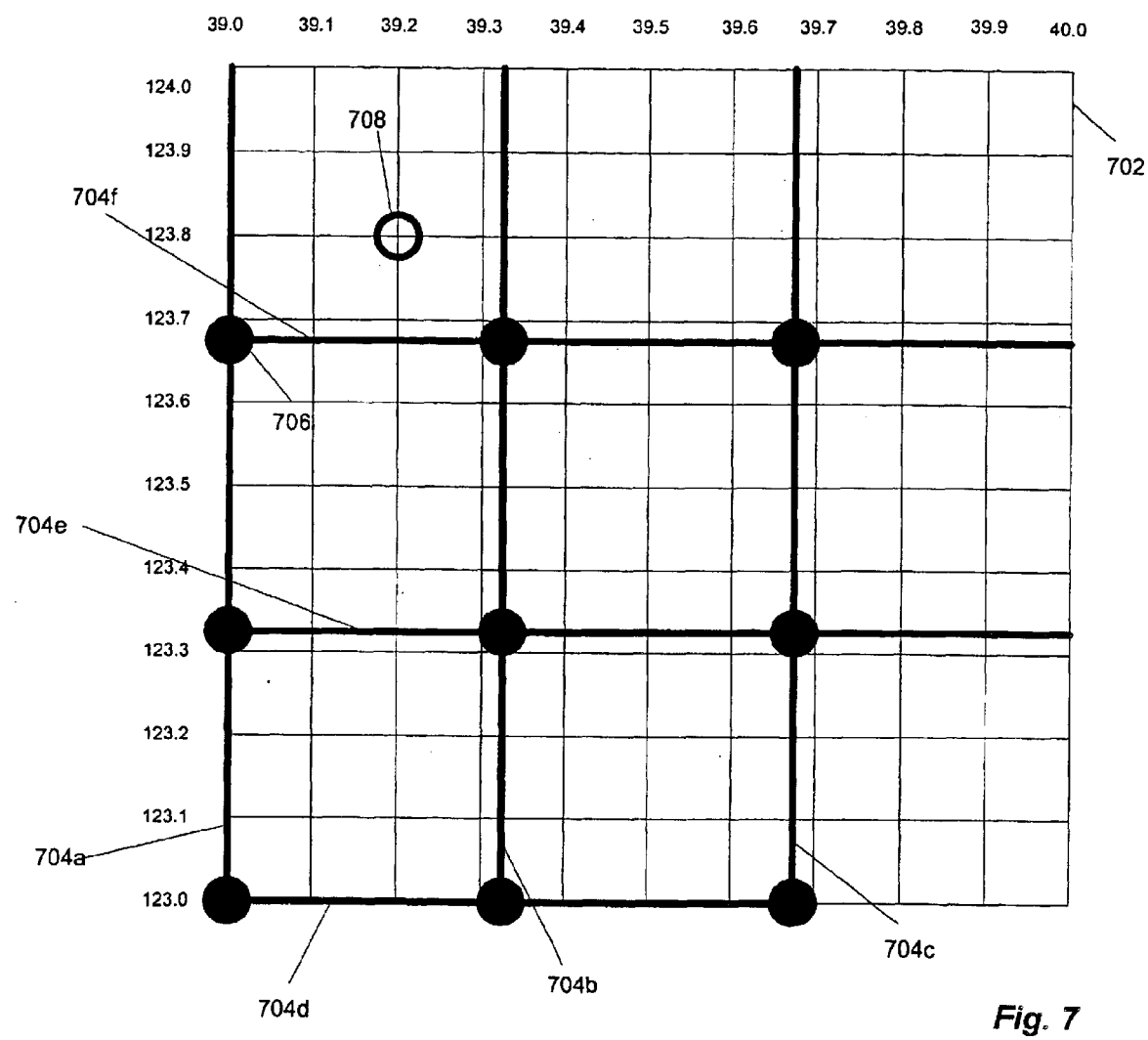
FIG. 7 is an illustration of a pixel showing subpixels and quantized positions in accordance with an embodiment of the present invention.

FIG. 7 illustrates an example of a pixel 702 that is, for purposes of illustration, subdivided into a 10×10 grid of subpixels. Overlaid on the pixel 702 are lines 704 which subdivide the pixel into three quantized regions for each of the x and y components.

FIG. 7 is therefore illustrative of the example presented above. The point in ideal space, (39.2, 123.8) 708 is shown, as is the point 706 as it is positioned in quantized device space at (39.0, 123.67).

Note that as the size of the glyph increases, small changes in its position in the device space become less noticeable. Accordingly, the larger the glyph, the less granular the quantization has to be in order to maintain a high degree of quality.

The present invention has been described in particular detail with respect to a limited number of embodiments.

Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the Font Quantization Engine and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems win appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for positioning glyphs at non-integer positions, the method comprising:

receiving glyph data, the glyph data including a glyph, and position data; and determining a quantized position for the glyph according to a quantization level and the position data.

2. The method of claim 1, further comprising determining a quantization level.

3. The method of claim 2 wherein each position has an associated plurality of components, the method further comprising:

determining the quantization level for each of the plurality of components.

4. The method of claim 3 wherein the quantized position for the glyph is a position in a device space, and determining a quantization level for a component (i) further comprises:

selecting an initial quantization level n;

selecting a point s in the device space such that $s[i]=1/n$;

using a font matrix, determining a point s' in an ideal space corresponding to the point s, and a point z in the ideal space corresponding to the origin in the device space;

determining a distance between the point s and the point z; and responsive to the distance between the point s and the point z not being less than a threshold amount
selecting a new quantization level such that the distance between the point s and the point z is less than the threshold amount.

5. The method of claim 3 wherein the quantized position for the glyph is a position in a device space, and determining a quantization level for a component (i) further comprises:

selecting an initial quantization level n;

selecting a point s in the device space such that $s[i]=1/n$;

using a font matrix, determining a point s' in an ideal space corresponding to the point s, and a point z in the ideal space corresponding to the origin in the device space;

determining a distance between the point s and the point z; and responsive to the distance between the point s and the point z being less than a threshold amount:

selecting the initial quantization level to be the quantization level.

6. The method of claim 1, further comprising rendering the quantized glyph.

7. The method of claim 1, wherein determining the quantized position for the glyph further comprises:

determining a quantized position associated with the glyph position data;

selecting as the quantized position for the glyph the determined quantized position.

8. The method of claim 7 wherein determining the quantized position p'[i] associated with the glyph position data further comprises:

determining a value a[i], such that a[i] is a fractional portion of the glyph position data, p[i];

determining a value b[i], such that b[i] is a product of the quantization level and a[i];

determining p'[i] such that p'[i] is a sum of an integer portion of p'[i] and a quotient of an integer portion of b[i] divided by the quantization level.

9. The method of claim 8, wherein determining the quantized position associated with the glyph position data further comprises determining a quantized position for each of a plurality of components associated with the glyph position data.

10. A font quantization engine comprising:

a quantization level calculator for determining a quantization level; and a position quantizer, communicatively coupled to the quantization level calculator, for quantizing glyphs according to their position in an ideal space, the determined quantization level, and a positioning function.

11. A computer program product for positioning glyphs at non-integer positions, the program product stored on a computer readable medium and adapted to perform the operations of:

receiving glyph data, the glyph data including a glyph, and position data; and determining a quantized position for the glyph according to a quantization level and the position data.

12. A font quantization engine comprising:

receiving means for receiving glyph data, the glyph data including a glyph, and position data; and determining means, communicatively coupled to the receiving means, for determining a quantized position for the glyph according to a quantization level and the position data.

* * * * *

UNITED STATES PATENT AND TRADEMARK OFFICE
CERTIFICATE OF CORRECTION

PATENT NO. : 6,897,870 B1
DATED : May 24, 2005
INVENTOR(S) : Derek B. Clegg

It is certified that error appears in the above-identified patent and that said Letters Patent is hereby corrected as shown below:

<u>Column 7,</u>
Line 19, please replace "integer portion of p'[i]" with -- integer portion of p[i] --.

Signed and Sealed this

Sixth Day of September, 2005

JON W. DUDAS
*Director of the United States Patent and Trademark Office*